(12) United States Patent
Ellinger et al.

(10) Patent No.: US 6,431,851 B1
(45) Date of Patent: Aug. 13, 2002

(54) INJECTION MOULDING MACHINE

(75) Inventors: Alfred Ellinger, Perg; Stefan Eppich, Arbing, both of (AT)

(73) Assignee: Engel Maschinenbau Gesellschaft mbH, Schwertberg (AT)

( * ) Notice: Subject to any disclaimer, the term of this patent is extended or adjusted under 35 U.S.C. 154(b) by 0 days.

(21) Appl. No.: 09/719,502

(22) PCT Filed: Oct. 21, 1999

(86) PCT No.: PCT/AT99/00255
§ 371 (c)(1),
(2), (4) Date: Dec. 12, 2000

(87) PCT Pub. No.: WO00/23242
PCT Pub. Date: Apr. 27, 2000

(30) Foreign Application Priority Data

Oct. 21, 1998 (AT) .............................. 688/98 U

(51) Int. Cl.⁷ .............................. B29C 45/66
(52) U.S. Cl. .................. 425/589; 425/450.1; 425/451.9
(58) Field of Search ............................. 425/589, 450.1, 425/451.9

(56) References Cited

U.S. PATENT DOCUMENTS 3,345,691 A * 10/1967 Aoki
4,606,717 A * 8/1986 Polak et al. ................. 425/541
5,556,656 A * 9/1996 Lampl et al. ................ 425/589
5,762,984 A * 6/1998 Wimbauer ................... 425/589

FOREIGN PATENT DOCUMENTS

| DE | 684536 | * 11/1939 |
| DE | 4230348 | * 3/1993 |
| EP | 188000 | * 7/1986 |

* cited by examiner

Primary Examiner—Tim Heitbrink
(74) Attorney, Agent, or Firm—Notaro & Michalos P.C.

(57) ABSTRACT

An injection molding machine has a machine frame, a stationary mold mounting plate and a mold mounting plate which is movable by a closure mechanism which is formed for example by a crank drive or a bell crank mechanism. The movable mold mounting plate and the stationary mold mounting plate are connected without beam members and exclusively by way of the machine frame so that the closing force which occurs during the closing procedure and the driving-open force which occurs during the injection between the mold mounting plates are passed only by way of the machine frame. A mold height adjustment mechanism is included and the closing force is transmitted from the closure mechanism by way of the mold height adjustment mechanism to the movable mold mounting plate.

14 Claims, 4 Drawing Sheets

INJECTION MOULDING MACHINE

FIELD AND BACKGROUND OF THE INVENTION

The invention concerns an injection molding machine comprising a machine frame, a stationary mold mounting plate and a mold mounting plate which is movable by a closure mechanism which is formed for example by a crank drive or a bell crank mechanism, wherein the movable mold mounting plate and the stationary mold mounting plate are connected without beam members exclusively by way of the machine frame so that the closing force which occurs during the closing procedure and the driving-open force which occurs during injection between the mold mounting plates are passed only by way of the machine frame, and comprising a mold height adjustment mechanism.

An injection molding machine of that kind is known from DE 42 30 348 C2.

In that injection molding machine, the drive for the bell crank mechanism is mounted movably, which results in considerable mass movements in the closing and opening procedures.

SUMMARY OF THE INVENTION

The object of the invention is to improve an injection molding machine of that kind.

The object according to the invention is achieved in that the closing force is transmitted from the closure mechanism by way of the mold height adjustment mechanism to the movable mold mounting plate.

It is advantageously provided that at least a part of the mold height adjustment mechanism engages the movable mold mounting plate.

An embodiment of the invention provides that the mold height adjustment mechanism includes at least one nut and at least one spindle which are mounted or accommodated in the movable mold mounting plate.

A very compact configuration for the movable mold mounting plate of the mold height adjustment mechanism is achieved in that the at least one nut is rotatably mounted in the movable mold mounting plate and that the at least one spindle projects into a cavity in the movable mold mounting plate.

A further embodiment of the invention provides that the mold height adjustment mechanism is actuated by a motor which is mounted on the movable mold mounting plate, the motor used being an electric motor, preferably a servo motor.

BRIEF DESCRIPTION OF THE DRAWINGS

An embodiment of the invention will now be described in greater detail with reference to the Figures of the accompanying drawings.

DESCRIPTION OF THE PREFERRED EMBODIMENTS

Figure 1:
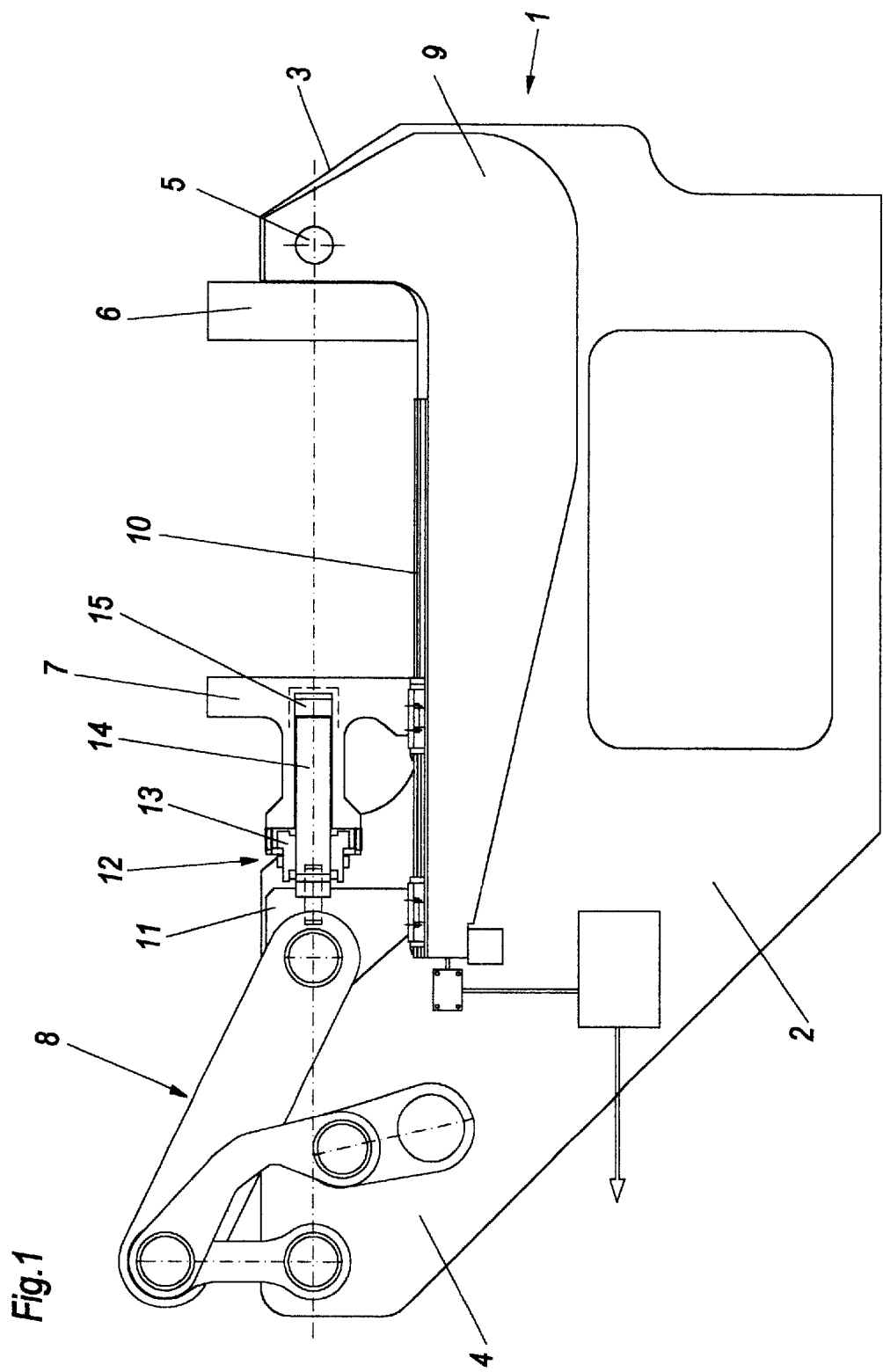
FIG. 1 is a diagrammatic side view of an injection molding machine according to the invention.

The injection molding machine shown in FIG. 1 has a substantially C-shaped frame 1 with a base portion 2 and limbs 3, 4. The stationary mold mounting plate 6 is arranged on the limb 3 by way of a pivot 5 and the displaceable mold mounting plate 7 is connected to the limb 4 of the C-shaped frame 1 by way of a closure mechanism 8. In the illustrated embodiment the closure mechanism 8 is formed by a bell crank mechanism combined with a crank drive. The closure mechanism 8 forms a part of the closing arrangement for mold halves (not shown) which are arranged on the mold mounting plates 6, 7, and is driven by an electric motor (not shown in FIG. 1) by way of a suitable transmission.

Also mounted pivotably about the pivot 5 is the L-shaped bracket 9 which is rigidly connected to the stationary mold mounting plate 6. The bracket 9 carries guide rails 10 on which the displaceable mold mounting plate 7 is slidable.

The L-shaped bracket 9 thus provides for parallel orientation of the mounting plates 6, 7. By virtue of the pivotal connection 5 of the stationary mold mounting plate 6 to the limb 3 of the frame 1 and the pivotal connection, which is implemented by way of the closure mechanism 8, of the displaceable mold mounting plate 7 to the limb 4 of the frame 1, the parallel orientation as between the mold mounting plates 6, 7 is maintained even while the closing force is being applied, if the C-shaped frame 1 is elastically deformed and the limbs 3, 4 are bent open. The limb 4 of the frame 1 serves as an end plate.

Beam member-less injection molding machines of that kind have long been known. A further description of details of such an injection molding machine is therefore not required at this juncture.

The closure mechanism 8, that is to say the bell crank mechanism combined with a crank drive, does not directly engage the movable mold mounting plate 7, but a pressure plate 11. The pressure plate 11, like the movable mold mounting plate 7, is movable on the rails 10 on the frame 1.

The movable mold mounting plate 7 is supported by way of the mold height adjustment mechanism 12 against the pressure plate 11. The mold height adjustment mechanism 12 includes at least one nut 13 which is mounted rotatably on the movable mold mounting plate 7 and into which engages at least one spindle 14 which is fixed to the pressure plate 11. The spindle 14 is held non-rotatably to the pressure plate 11 and projects into a cavity 15 in the movable mold mounting plate 7. At the front end, the spindle 14 is provided with a guide 16 for the spindle 14 in the cavity 15. In the illustrated embodiment the guide 16 is in the form of a plain bearing.

Figure 2:
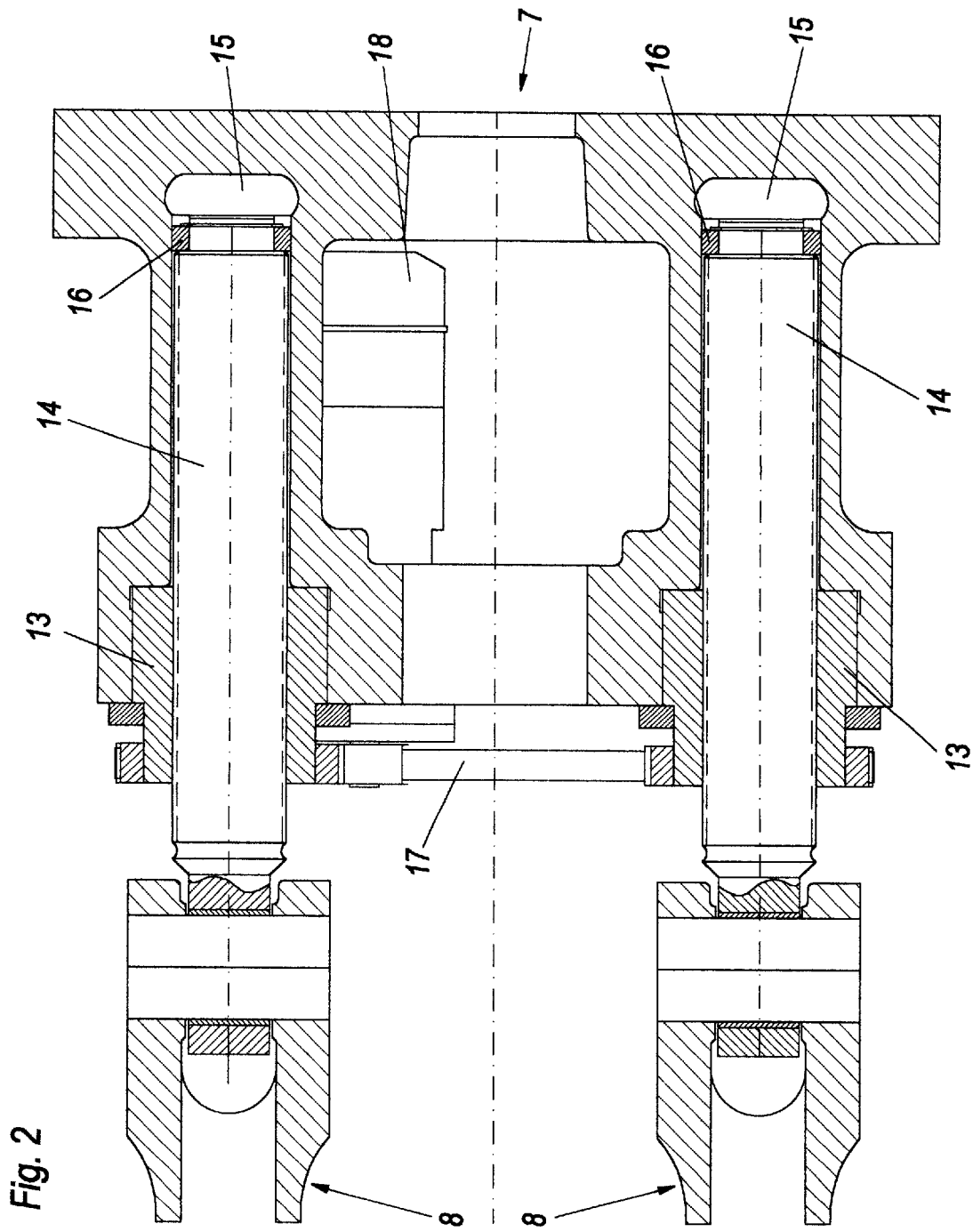
FIG. 2 is a view in horizontal section through a movable mold mounting plate with the mold height adjustment mechanism.
Figure 3:
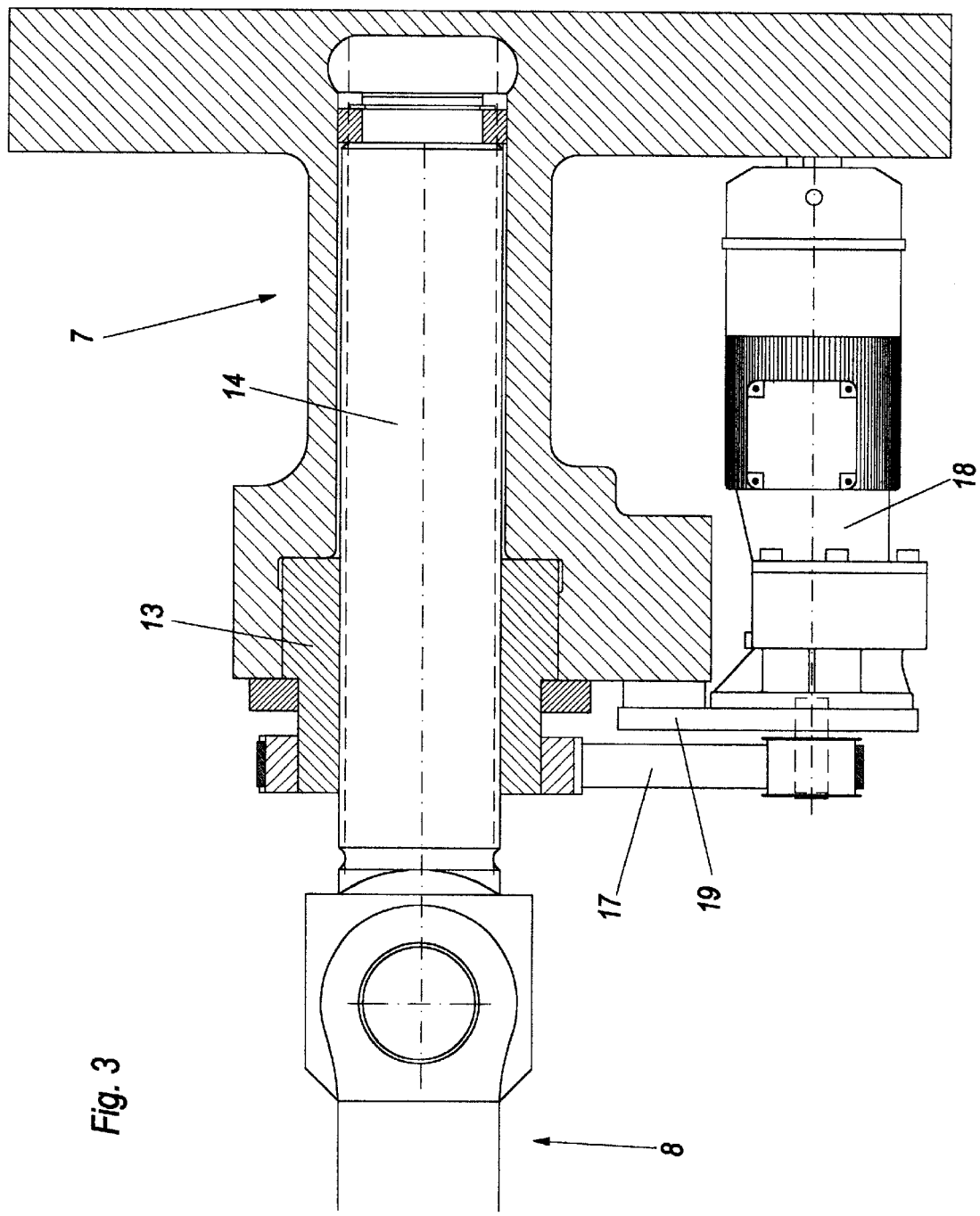
FIG. 3 is a view in vertical section through the movable mold mounting plate with the mold height adjustment mechanism.
Figure 4:
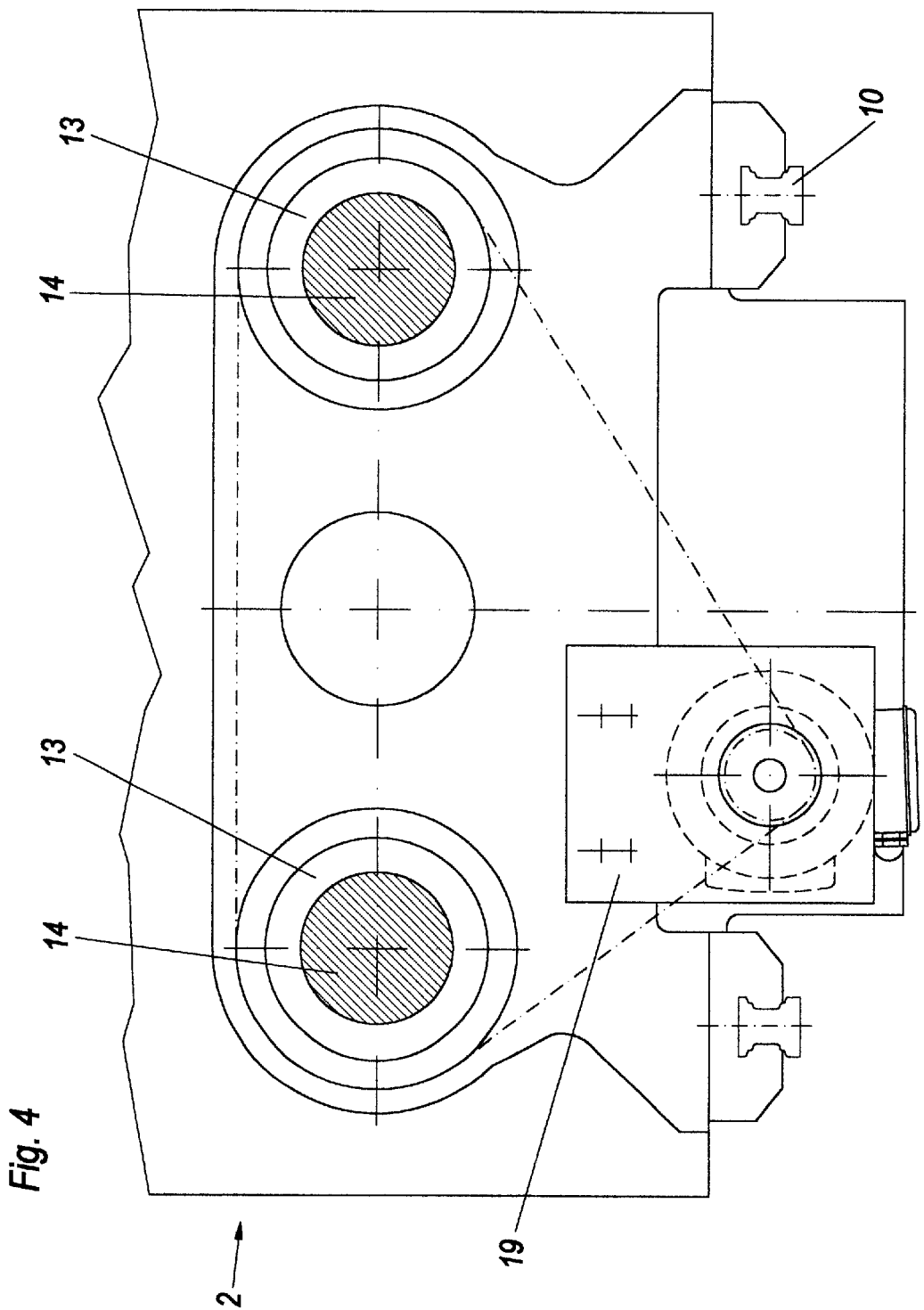
FIG. 4 is a front view of the movable mold mounting plate, with the mold height adjustment mechanism being shown partly in section.

As can be seen from FIGS. 2 and 4, in the illustrated embodiment the movable mold mounting plate 7 is provided with two nuts 13 and two spindles 14. The nuts 13 are driven by way of V-belts 17 by an electric motor 18 which is preferably in the form of a servo motor. If mold height adjustment should not be necessary very often, it is also possible to use a three-phase motor instead of a servo motor. The electric motor 18 is mounted by way of a bracket 19 to the movable mold mounting plate 7, more specifically beneath the spindles 14.

The configuration according to the invention makes it possible for the drive motor for the closure mechanism 8 to be supported stationarily on the frame 1, preferably on the base portion 2.

What is claimed is:

1. An injection molding machine comprising a machine frame, a stationary mold mounting plate and a mold mounting plate which is movable by a closure mechanism, wherein the movable mold mounting plate and the stationary mold mounting plate are connected without beam members exclusively by way of the machine frame so that the closing force which occurs during the closing procedure and the driving-open force which occurs during injection between the mold mounting plates are passed only by way of the machine frame, and comprising a mold height adjustment mechanism, characterised in that the closing force is transmitted from the closure mechanism by way of the mold height adjustment mechanism to the movable mold mounting plate.

2. An injection molding machine as set forth in claim 1 characterised in that at least a part of the mold height adjustment mechanism engages the movable mold mounting plate.

3. An injection molding machine as set forth in claim 1 characterised in that the mold height adjustment mechanism includes at least one nut and at least one spindle which are mounted or accommodated in the movable mold mounting plate.

4. An injection molding machine as set forth in claim 3 characterised in that the at least one nut is mounted rotatably in the movable mold mounting plate.

5. An injection molding machine as set forth in claim 3 characterised in that the at least one spindle projects into a cavity in the movable mold mounting plate.

6. An injection molding machine as set forth in claim 5 characterised in that at its end remote from the closure mechanism the at least one spindle is provided with a guide, for example in the form of a bearing or a plain bush, with which it is guided at the wall of the cavity.

7. An injection molding machine as set forth in claim 3 characterised in that the mold height adjustment mechanism of the movable mold mounting plate includes two spindles and two nuts.

8. An injection molding machine as set forth in claim 1 characterised in that the mold height adjustment mechanism is actuated by a motor mounted on the movable mold mounting plate.

9. An injection molding machine as set forth in claim 8 characterised in that an electric motor is used as the motor.

10. An injection molding machine as set forth in claim 9 characterised in that a servo motor is used as the motor.

11. An injection molding machine as set forth in claim 3 characterised in that the motor is arranged beneath the at least one spindle.

12. An injection molding machine as set forth in claim 1, characterised in that the closure mechanism is formed by a crank drive mechanism.

13. An injection molding machine as set forth in claim 1 characterised in that the closure mechanism is formed by a bell crank mechanism.

14. An injection molding machine as set forth in claim 9 characterised in that the electric motor is a three phase motor.

* * * * *